Dec. 29, 1964 H. G. BLANK 3,163,764

ELECTROLUMINESCENT SWITCHING CIRCUIT

Filed Jan. 3, 1961

INVENTOR.
HANS G. BLANK

BY R. J. Frank
ATTORNEY

United States Patent Office 3,163,764
Patented Dec. 29, 1964

3,163,764

ELECTROLUMINESCENT SWITCHING CIRCUIT

Hans G. Blank, New York, N.Y., assignor to General Telephone and Electronics Laboratories, Inc., a corporation of Delaware Filed Jan. 3, 1961, Ser. No. 80,222
7 Claims. (Cl. 250—208)

This invention relates to switching circuits and in particular to switching circuits utilizing electroluminescent and photoconductive components.

Switching circuits designed to indicate the existence of a given condition or the absence of that condition in response to an applied input signal find wide use in digital computers as well as in many other types of electrical apparatus. It is an object of my invention to provide an improved switching circuit of this type which utilizes electroluminescent and photoconductive components.

It is a further object to provide a switching circuit in which the output device is isolated from the remainder of the circuit and may have any desired impedance value.

Another object is to provide a switching circuit in which the output may be optical in nature, may be a variable impedance, or may be both.

Still another object is to provide a switching circuit using electroluminescent and photoconductive components in which switching from one state to the other is positive in action and is effected at relatively high speed.

Yet another object is to provide a switching circuit which may be manufactured easily and inexpensively and which requires very little space.

In accordance with the present invention, first and second electroluminescent cells are connected in series between a pair of terminals connected to a voltage source. A photoconductor is provided which is electrically connected in parallel with the first electroluminescent cell while being optically coupled to an input light source. The electroluminescent cells and photoconductor are so selected that the parallel impedance presented by the first electroluminescent cell and the photoconductor is greater than the impedance of the second electroluminescent cell, when the photoconductor is not illuminated. When the photoconductor is illuminated by the input light source, the parallel impedance of the first electroluminescent cell and the photoconductor drops to a low value relative to the impedance of the second electroluminescent cell. This difference in impedance may be obtained by making the area of the second electroluminescent cell consideraly greater than that of the first electroluminescent cell or by connecting a capacitor in parallel with the second electroluminescent cell.

With the input light source deenergized, application of voltage across the first and second electroluminescent cells causes the first electroluminescent cell to light since most of the applied voltage appears across its terminals. When the input light source, which may be in the form of a third electroluminescent cell, is energized it illuminates the photoconductor causing its imepdance to drop sharply. This effectively short circuits the first electroluminescent cell causing it to be essentially extinguished and lights the second electroluminescent cell which now has almost all of the applied voltage across its terminals. Thus, the lighting of only the first electroluminescent cell indicates the absence of an input signal (which may arbitrarily be designated as corresponding to a binary "0") while the lighting of only the second electroluminescent cell indicates the presence of an input signal, or a binary "1."

In another embodiment of the invention, second and third shunting photoconductors are each placed in parallel with the first and second electroluminescent cells respectively, the second photoconductor being optically coupled to the second electroluminescent cell and the third photoconductor being optically coupled to the first electroluminescent cell. The impedances of the second and third photoconductors, when illuminated, are low enough to accelerate the switching speed of the device by diverting current around the darkened electroluminescent cell, but are high enough to prevent complete short circuiting of the cell.

The above objects of and the brief introduction to the present invention will be more fully understood and further objects and advantages will become apparent from a study of the following description in connection with the drawings, wherein.

Figure 1:
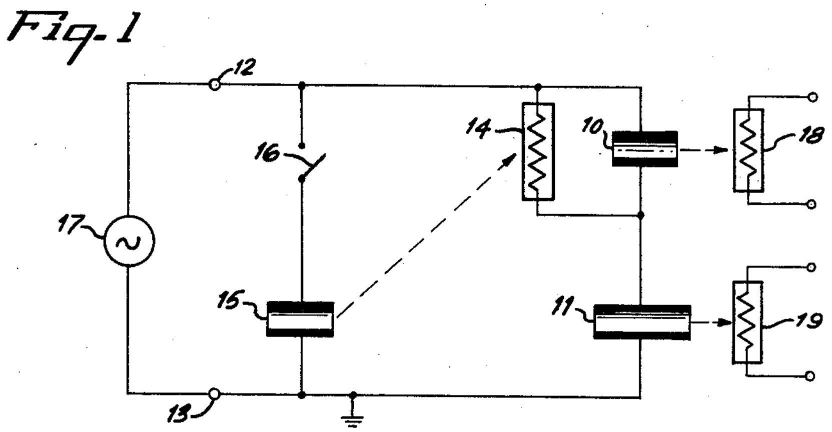
FIG. 1 is a schematic diagram of one form of the invention.

Referring to FIG. 1, there is shown a first electroluminescent cell 10 and a second electroluminescent cell 11 connected in series across a pair of terminals 12 and 13. A photoconductor 14 is electrically connected in parallel with electroluminescent cell 10 and is optically coupled to a third electroluminescent cell 15. Electroluminescent cell 15 is connected directly to grounded terminal 13 and is connected through a switch 16 to terminal 12. An alternating voltage source 17 is also connected across terminals 12 and 13. Output photoconductors 18 and 19 are optically coupled to electroluminescent cells 10 and 11 respectively to provide a variable impedance output as well as an optical output.

The impedance of electroluminescent cell 11 is substantially lower than the impedance presented by the parallel combination of electroluminescent cell 11 and photoconductor 14 when the latter is not illuminated. This may be accomplished by making the area of electroluminescent cell 11 much greater than that of electroluminescent cell 10 (as indicated diagrammatically in FIG. 1) or by fabricating cell 11 from a material having a higher dielectric constant than that of electroluminescent cell 10. Also, a capacitor may be connected across electroluminescent cell 11 to decrease the impedance between the junction of electroluminescent cells 10, 11 and ground. In general, satisfactory operation is obtained when the ratio of the impedances of electroluminescent cell 10 to that of electroluminescent cell 11 is aproximately 10 to 1.

With switch 16 open, electroluminescent cell 15 is deenergized and photoconductor 14 is dark. Most of the voltage applied by source 17 is impressed across electroluminescent cell 10 and therefore this cell emits light. Only a small portion of the voltage appears across electroluminescent cell 11 and it emits essentially no light. The light from electroluminescent cell 10 may be used directly to actuate a load device or it may be used to control the impedance of a photoconductor 18.

When switch 16 is closed electroluminescent cell 15 is energized. Light from cell 15 illuminates photoconductor 14 thereby short circuiting electroluminescent cell 10. Most of the voltage from source 17 is now applied across electroluminescent cell 11 causing it to emit light. The light from electroluminescent cell 11 may be used directly or may be allowed to fall upon photoconductor 19 to decrease its impedance. Substantially no voltage appears across electroluminescent cell 10 due to the shorting action of illuminated photoconductor 14 and therefore electroluminescent cell 10 becomes dark, the impedance of photoconductor 18 changing from a low value to a high value. Thus, with switch 16 open, electroluminescent cell 10 emits light and the impedance of photoconductor 18 is low; with switch 16 closed, electroluminescent cell 11 emits light and the impedance of photoconductor 19 is low. The first condition may be arbitrarily designated as indicating a binary "0" while the second condition may be designated as indicating a binary "1."

Figure 2:
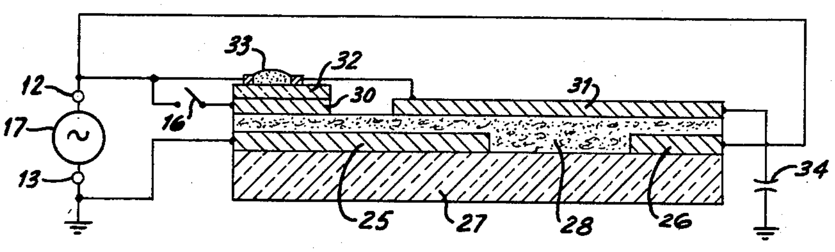
FIG. 2 is a cross-sectional view of a modification of the invention of FIG. 1.

In FIG. 2 there is shown a cross sectional view of a modified form of a circuit of FIG. 1. Conductive layers 25 and 26 are fixed to a glass base 27 and an electroluminescent layer 28 is deposited over layers 25 and 26. A transparent conductive layer 30 is secured to electroluminescent layer 28 over one side of conductor 25 while another transparent conductive layer 31 is secured to the electroluminescent layer 28 adjacent conductive layers 25 and 26. An insulating layer 32 is affixed to transparent conductive layer 30 and a photoconductor 33 is deposited on the surface of insulating layer 32. It may be noted by reference to FIG. 1 that the electroluminescent cell composed of conductors 25, 30 and the portion of electroluminescent layer 28 located between these conductors corresponds to electroluminescent cell 15 while conductors 25, 31 and the portion of the electroluminescent layer 28 therebetween correspond to electroluminescent cell 11. Similarly, conductors 26, 31 and the portion of electroluminescent layer 28 located between these conductors correspond to electroluminescent cell 10.

The device shown in FIG. 2 differs from that shown in FIG. 1 in that a capacitor 34 is connected from conductive layer 31 to ground in order to increase the effective capacitance of electroluminescent cell 11. Also photoconductors 18 and 19 have been omitted from the embodiment shown in FIG. 2.

Figure 3:
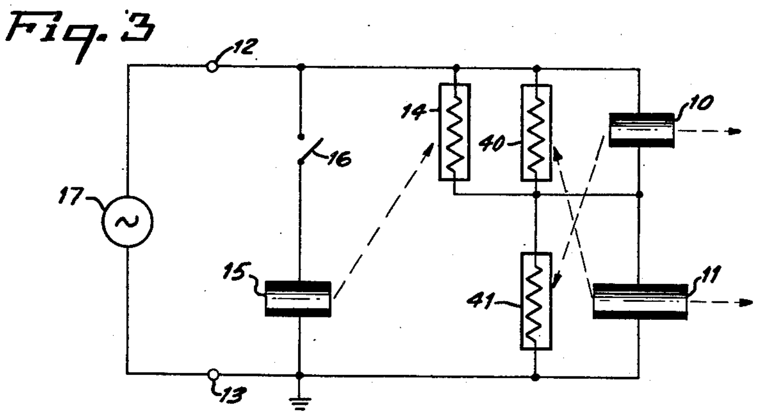
FIG. 3 is a schematic diagram of another form of the invention.

FIG. 3 depicts another form of the invention which provides a more rapid and positive switching from one state to the other. As shown in this figure, photoconductors 40 and 41 have been connected in parallel with electroluminescent cells 10 and 11 respectively, photoconductor 40 being optically coupled to electroluminescent cell 11 and photoconductor 41 being optically coupled to electroluminescent cell 10. With switch 16 open, the application of voltage source 17 to the circuit causes electroluminescent cell 10 to light while electroluminescent cell 11 is dark due to the higher impedance of cell 10. Light from electroluminescent cell 10 falls upon conductor 41 causing the impedance of photoconductor 41 to decrease and further reduce the parallel impedance produced by electroluminescent cell 11 and photoconductor 41.

When switch 16 is closed, light from electroluminescent cell 15 falls upon photoconductor 14 thereby tending to reduce the voltage across electroluminescent cell 10. This action is accelerated by the reduction in the impedance of photoconductor 40 as light from electroluminescent cell 11 falls upon it. Thus, the addition of photoconductors 40 and 41 to the circuit provides a "snap" action which assures rapid and positive switching from one state to the other. It is essential that the impedances of photoconductors 40 and 41 when illuminated be low enough to bypass sufficient current around the electroluminescent cells to provide positive switching. The dark impedances of the photoconductors must also be high enough to prevent their completely short circuiting the electroluminescent cell.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A switching circuit comprising first and second series-connected electroluminescent cells, said second electroluminescent cell having a substantially lower impedance than said first electroluminescent cell, photoconductor means electrically connected in parallel with said first electroluminescent cell, said photoconductor means being optically isolated from said first and second electroluminescent cells, said first electroluminescent cell emitting light when a voltage is impressed across said first and second electroluminescent cells and said photoconductors means is dark, and said second electroluminescent cell emitting light when a voltage is impressed across said first and second cells and said photoconductor means is illuminated.

2. A switching circuit comprising first and second series-connected electroluminescent cells, a capacitor electrically connected in parallel with said second electroluminescent cell, a photoconductor electrically connected in parallel with said first electroluminescent cell, said photoconductor being optically isolated from said first and second electroluminescent cells, and means for applying a voltage across said series-connected electroluminescent cells, said first electroluminescent cell emitting light when said photoconductor is dark and said second electroluminescent cell emitting light when said photoconductor is illuminated.

3. A switching circuit comprising first and second series-connected electroluminescent cells, the impedance between the junction of said electroluminescent cells and the other end of said second electroluminescent cell being substantially lower than the impedance between said junction and the other end of said first electroluminescent cell, a first photoconductor electrically connected in parallel with said first electroluminescent cell, said first photoconductor being optically isolated from said first and second electroluminescent cells, second and third photoconductors optically coupled to said first and second electroluminescent cells respectively, and terminal means for applying a voltage across said first and second series-connected electroluminescent cells, said second photoconductor having its impedance changed from a low value to a relatively high value and said third photoconductor having its impedance changed from a high value to a relatively low value when said first photoconductor is illuminated.

4. A switching circuit comprising first and second series-connected electroluminescent cells, the impedance between the junction of said first and second electroluminescent cells and the other end of said second cell being substantially lower than the impedance between said junction and the other end of said first electroluminescent cell, a photoconductor electrically connected in parallel with said first electroluminescent cell, said photoconductor being optically isolated from said first and second electroluminescent cells, a third electroluminescent cell optically coupled to said photoconductor, terminal means for applying a voltage across said first and second series-connected electroluminescent cell, and means for selectively applying a voltage across said third electroluminescent cell, said first electroluminescent cell emitting light and said second electroluminescent cell being dark when said third electroluminescent cell is deenergized, and said second electroluminescent cell emitting light and said first electroluminescent cell being dark when said third electroluminescent cell is energized.

5. A switching circuit comprising first and second series-connected electroluminescent cells, the impedance between the junction of said electroluminescent cells and the other end of said second electroluminescent cell being substantially lower than the impedance between said junction and the other end of said first electroluminescent cell, a first photoconductor electrically connected in parallel with said first electroluminescent cell, said first photoconductor being optically isolated from said first and second electroluminescent cells, second and third photoconductors optically coupled to said first and second electroluminescent cells respectively, a third electroluminescent cell optically coupled to said first photoconductor, means for applying a voltage across said first and second series-connected electroluminescent cells, and means for selectively applying a voltage across said third electroluminescent cell, said second photoconductor having its impedance changed from a low value to a relatively high value and said third photoconductor having its impedance changed from a high value to a relatively low value when said third electroluminescent cell is energized.

6. A switching circuit comprising first and second series-connected electroluminescent cells, said second electroluminescent cell having a substantially lower impedance than said first eletroluminescent cell, a first photoconductor electrically connected in parallel with said first electroluminescent cell, said first photoconductor being optically isolated from said first and second electroluminescent cells, second and third shunting photoconductors electrically connected in parallel with said first and second electroluminescent cells respectively, said second shunting photoconductor being optically coupled to said second electroluminescent cell and said third shunting photoconductor being optically coupled to said first electroluminescent cell, and a third electroluminescent cell optically coupled to said first photoconductor, said first electroluminescent cell emitting light and said second electroluminescent cell being dark when said third electroluminescent cell is dark and said first electroluminescent cell being dark and said second electroluminescent cell emitting light when said third electroluminescent cell is emitting light.

7. A switching circuit comprising an electroluminescent cell, a capacitive element connected in series with said electroluminescent cell, the impedance of said capacitive element being substantially less than the impedance of said electroluminescent cell, a photoconductor electrically connected in parallel with said electroluminescent cell, said photoconductor being optically isolated from said electroluminescent cell, an input light source optically coupled to said photoconductor, and means for applying a voltage across said series connected electroluminescent cell and capacitive element, said electroluminescent cell emitting light when said input light source is dark and said electroluminescent cell being dark when said input light source is emitting light.

References Cited by the Examiner

UNITED STATES PATENTS

| | | | |
|---|---|---|---|
| 2,954,476 | 9/60 | Ghandhi | 250—213 X |
| 2,975,290 | 3/61 | Spitzer | 250—213 |
| 3,038,081 | 6/62 | Montemurro | 250—213 |
| 3,059,144 | 10/62 | Bowerman | 250—213 |

OTHER REFERENCES

Standeven: Opto-Electronic Ring Counter, IBM Technical Disclosure Bulletin, vol. 2, No. 2, August 1959.

Low: Photologic Exclusive Or Block, IBM Technical Disclosure Bulletin, vol. 2, No. 5, February 1960.

RALPH G. NILSON, *Primary Examiner.*

MAX L. LEVY, ARCHIE R. BORCHELT, *Examiners.*